US007052520B2

(12) United States Patent
Darwent et al.

(10) Patent No.: US 7,052,520 B2
(45) Date of Patent: May 30, 2006

(54) ARTICLE AND PROCESS FOR CLEANING FABRICS

(75) Inventors: James Robert Darwent, Bebington (GB); Sandra Hemmington, Bedford (GB); Neil James Parry, Sharnbrook (GB)

(73) Assignee: Unilever Home & Personal Care USA, a division of Conopco, Inc., Greenwich, CT (US)

(*) Notice: Subject to any disclaimer, the term of this patent is extended or adjusted under 35 U.S.C. 154(b) by 333 days.

(21) Appl. No.: 10/442,379

(22) Filed: May 21, 2003

(65) Prior Publication Data

US 2004/0072713 A1 Apr. 15, 2004

(30) Foreign Application Priority Data

May 23, 2002 (EP) .................................. 02253631

(51) Int. Cl.
*C12S 11/00* (2006.01)
*D06M 16/00* (2006.01)

(52) U.S. Cl. .......................... 8/137; 510/294; 510/399; 435/264

(58) Field of Classification Search .................... 8/137; 510/294, 399; 435/264
See application file for complete search history.

(56) References Cited

U.S. PATENT DOCUMENTS 4,655,794 A * 4/1987 Richardson et al. ........ 510/393
5,580,644 A * 12/1996 Minami ...................... 428/221
5,863,789 A * 1/1999 Komatsu et al. ............ 435/262
5,863,882 A * 1/1999 Lin et al. .................... 510/397
6,095,163 A * 8/2000 McClure et al. ............ 134/111
6,140,106 A * 10/2000 Lawler et al. ........... 435/252.5

FOREIGN PATENT DOCUMENTS

| | | | |
|---|---|---|---|
| CA | 2243011 | * | 7/1998 |
| EP | 224 920 | | 6/1987 |
| EP | 423 890 | | 4/1991 |
| EP | 924 221 | | 6/1999 |
| GB | 953414 | | 3/1964 |
| WO | 86/04088 | | 7/1986 |
| WO | 91/10723 | | 7/1991 |
| WO | 95/01426 | | 6/1995 |
| WO | 97/11217 | | 3/1997 |
| WO | 97/24428 | | 7/1997 |

OTHER PUBLICATIONS

PCT Search Report in a PCT application PCT/EP 03/04706, no date available.
EP Search Report in an EP application EP 02 25 3631, Oct. 25, 2002.
Derwent Abstract of EP 224 920 published Jun. 10, 1987.
Hage et al., "*Efficient Manganese catalysts for low-temperature bleaching*", Letter to Nature, vol. 369, Jun. 23, 1994, pp. 637-639.

* cited by examiner

*Primary Examiner*—Margaret Einsmann
(74) *Attorney, Agent, or Firm*—Rimma Mitelman

(57) ABSTRACT

An article for use in an enzymatic fabric cleaning process, said article containing one or more types of harmless micro-organisms capable of excreting enzymes useful in said fabric cleaning process. Furthermore, there is provided an enzymatic method of cleaning fabrics, whereby soiled fabrics are soaked with water in the presence of said article.

10 Claims, 4 Drawing Sheets

Biobag performance on oily tomato stains.

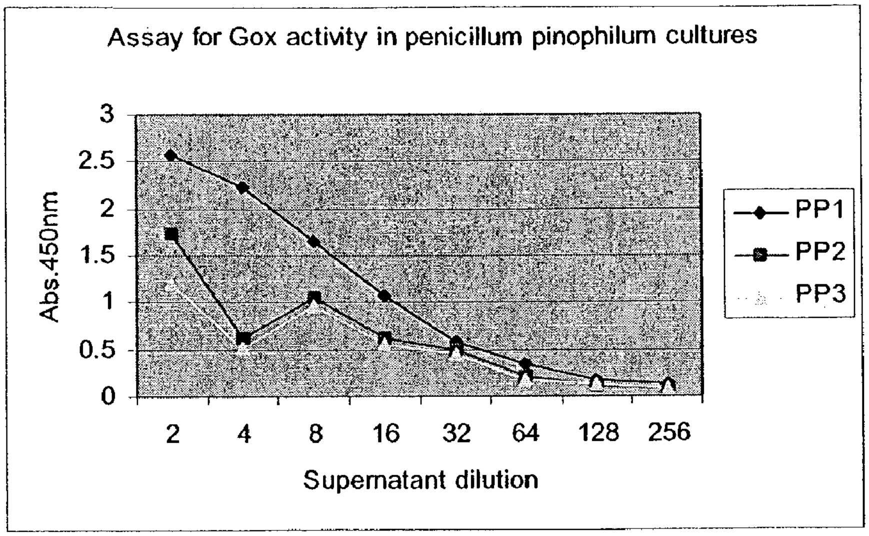
Figure 1a. Production of sugar oxidase in *Penicillium pinophilum*
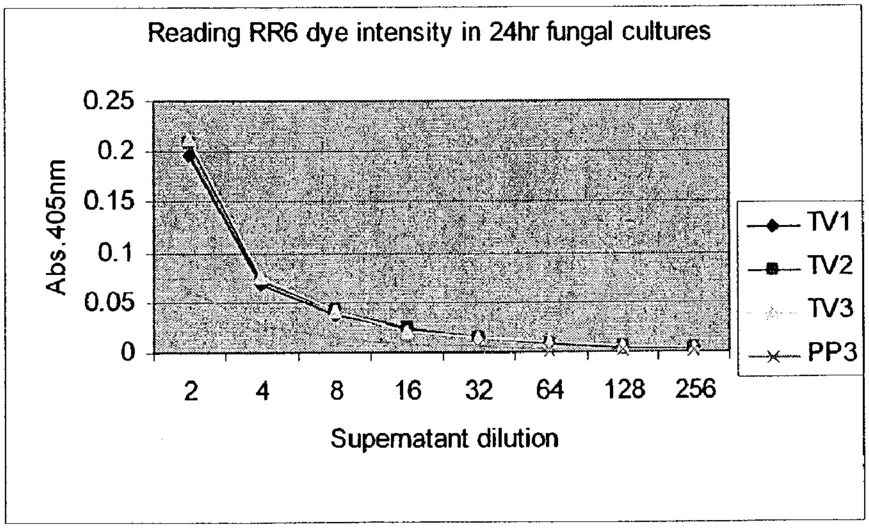
Figure 1b. Bleaching of RR6 by sugar oxidase

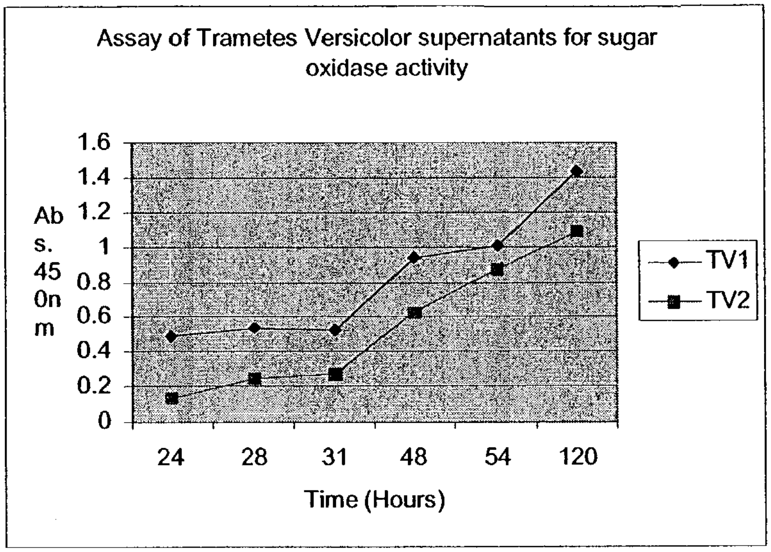
Figure 2a: Production of Sugar Oxidase in *Trametes Versicolor* cultures
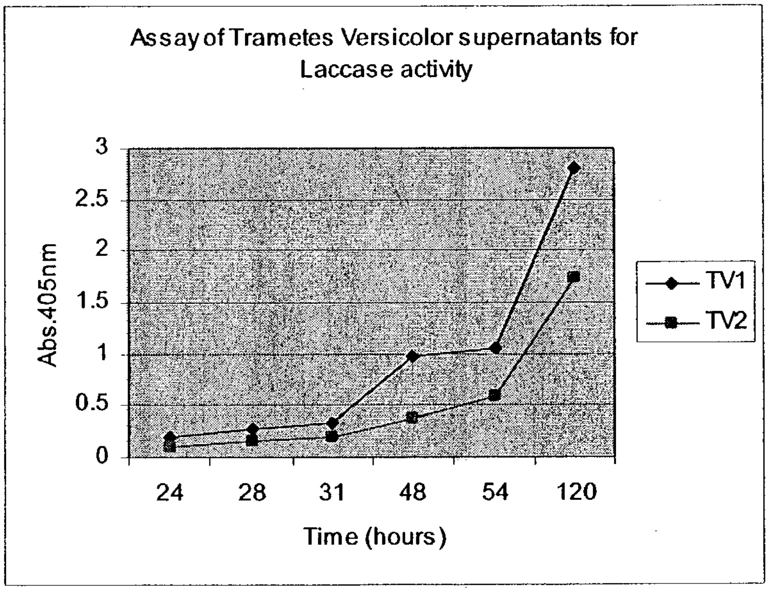
Figure 2b: Production of laccase in *Trametes Versicolor* cultures

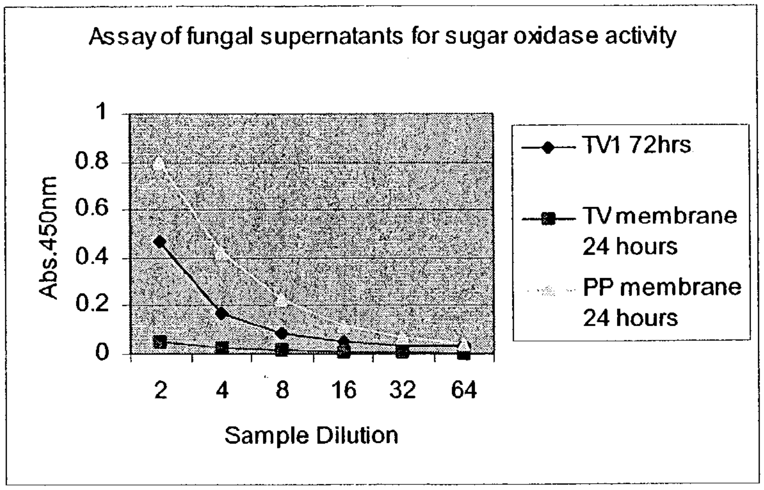
Figure 3. Production of Sugar Oxidase in sachet prototype
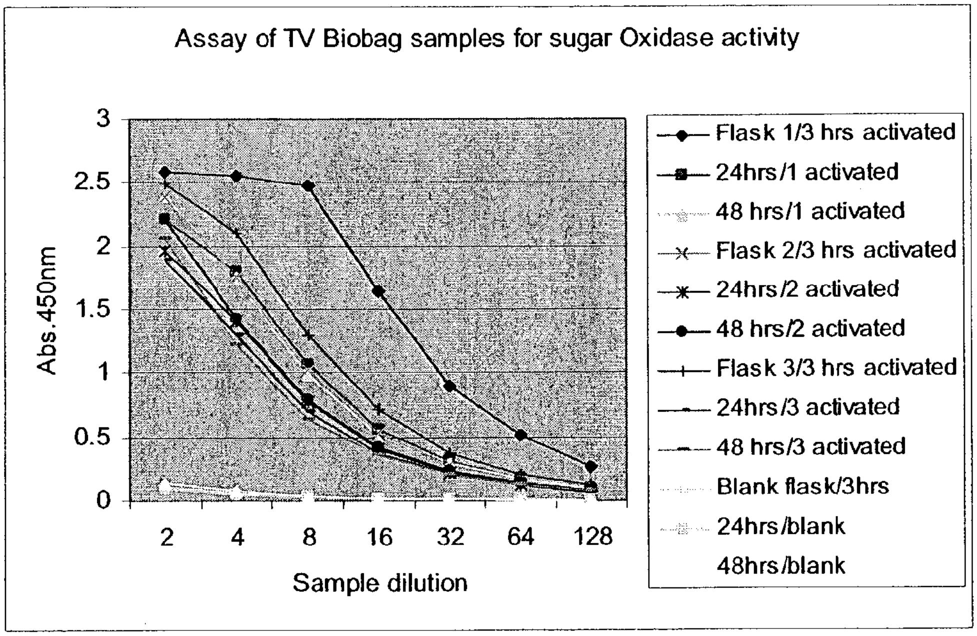
Figure 4. Sugar Oxidase activity in biobag cultures

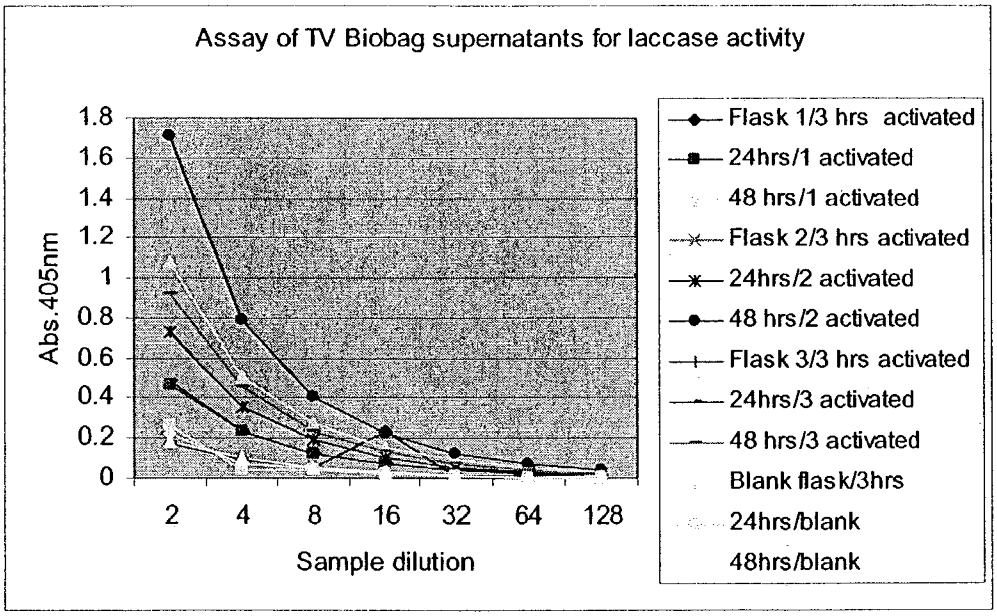
Figure 5. Sugar Laccase activity in biobag cultures
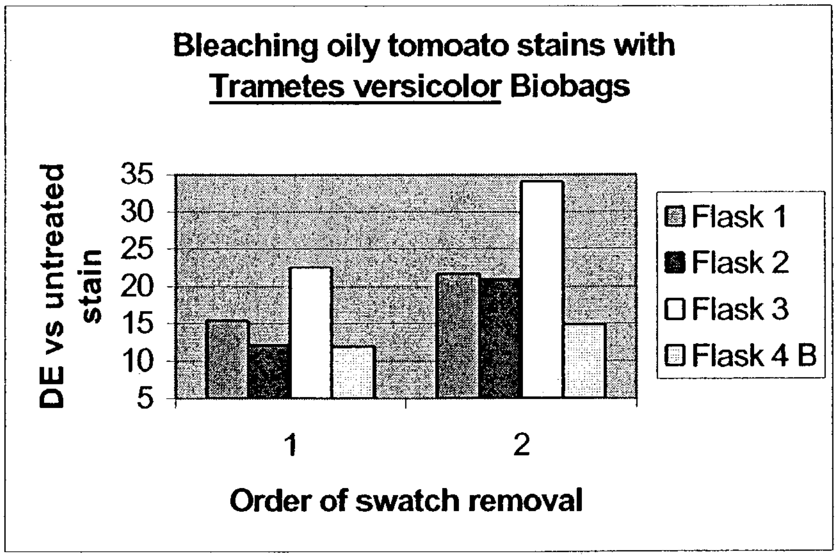
Figure 6. Biobag performance on oily tomato stains.

ARTICLE AND PROCESS FOR CLEANING FABRICS

FIELD OF INVENTION

The present invention relates to an article for use in an enzymatic cleaning process and to the use of said article in an enzymatic cleaning process. The article is especially useful for the hand-wash market as it can be used in a low cost enzymatic fabric cleaning process.

BACKGROUND

In many countries of the world, fabrics are washed by hand. The conventional process of washing fabrics by hand is very labour intensive for the washer, requiring the repeated application of soap, usually from bars, or low cost detergent powders followed by rubbing and pounding to remove stubborn stains. It is therefore desirable to make this process more effective and convenient to the user. The process would be aided greatly by the application of enzymes in order to break down proteins and/or oxidise food stains. However, enzymes are the most expensive ingredients of detergent formulations and the addition of enzymes to formulations for washing by hand would increase the cost of the product beyond the pocket of many users. Another problem associated with the conventional hand washing process is, that the dirt and dye removed in the process is often redeposited onto the washed fabrics, so that the overall cleaning result is sometimes disappointing.

It is therefore an object of the present invention to provide a novel enzymatic process for washing fabrics by hand, which overcomes the above mentioned draw-backs. Surprisingly, it has now been found that the above-mentioned draw-backs can be overcome by the article according to the invention, said article containing one or more types of harmless micro-organisms capable of excreting enzymes useful in said fabric cleaning process.

DEFINTION OF THE INVENTION

According to a first aspect of the invention, there is provided an article for use in an enzymatic fabric cleaning process, said article containing one or more types of harmless micro-organisms capable of excreting enzymes useful in said fabric cleaning process.

According to a second aspect of the invention, there is provided an enzymatic cleaning process for fabrics, whereby soiled fabrics are soaked with water in the presence of the article according to the invention.

DETAILED DESCRIPTION OF THE INVENTION

The article according to the invention for use in an enzymatic fabric cleaning process contains one or more types of harmless micro-organisms capable of excreting enzymes useful in said fabric cleaning process. The article can be in the form of a porous granule, a sponge-like fabric, or a water-permeable pouch or sachet. It contains harmless micro-organisms in such a manner that they are effectively contained within the article and cannot disperse from it into the wash water. For instance, they can be immobilized on an organic polymeric material within a water-permeable bag made of cellulosic or plastic polymer derivative. In use, the article is put into a bucket together with the fabrics that are to be cleaned and allowed to stand with water for some time. This soaking process will release part of the soil from the fabrics. The dissolved soil will comprise some organic molecules that can be utilized by the micro-organisms as a carbon and energy source to generate a range of different enzymes in the wash solution. Thus, the article allows the micro-organisms to utilise an external carbon and energy source that is capable of transferring across the article. The carbon and energy source may also be supplied with the article in the first instance such that cleaning enzymes are produced upon wetting. This allows cleaning activity to occur relatively independently of the presence and nature of the stain components.

It is especially useful if, in addition to enzymes, the micro-organisms are also capable of producing other chemical entities that contribute to the cleaning process, e.g. biosurfactants, for example lipopolysaccharides. Examples of suitable lipopolysaccharides are described in EP-A-924 221.

Furthermore, the matrix on which the micro-organisms are immobilized can also act as an absorber so as to remove particulates, dyes and/or oils from the wash water. In another embodiment, there is provided a dual purpose system, comprising one bag containing the enzyme producing micro-organisms and another separate bag ("binder bag") to clean water, absorb dyes etc. This binder-bag can be used in the pre-treatment of water that is to be used for washing. Its purpose is to remove part or all of any particulates, oils or dyes. This is especially useful for areas where environmental fouling is high. The change in colour of the bag and its contents delivers a strong consumer cue and reinforces the message that the wash water is sufficiently clean and ready for use.

The micro-organisms used in the invention are harmless micro-organisms; i.e. they are not hazardous for humans and produce no substances that are potentially toxic or otherwise dangerous for humans or the environment. The micro-organisms are capable of producing and secreting useful laundry enzymes such as Oxidoreductases, Carbohydrases, Proteases, Lipases, Transferases and Glycosidases. Examples of such micro-organisms are fungi and/or bacteria, such as *Penicillium* sp, *Curvularia* sp, *Trametes* sp, *Hansenula* sp, *Pyricularia* sp, *Hordeum* sp, *Rhizopus* sp, *Candida* sp, *Trichoderma* sp, *Aspergillus* sp, *Cellulonomas* sp, *Streptococcus* sp, *Bacillus* sp, *Flavobacterium* sp etc. The micro-organism strain may be genetically modified to generate overproducing variants. Such over-producing strains are utilized today in the large-scale manufacture of enzymes by fermentation for industrial applications.

The enzyme may be selected from Oxidoreductases (such as sugar oxidases, peroxidases, laccases, phenol oxidases), Carbohydrases (such as cellulases, hemicellulases, pectinases, amylases), Proteases, Lipases, Transferases and Glycosidases. Oxidases are enzymes capable of generating hydrogen peroxide. Useful examples of oxidases are amine oxidase, amino acid oxidase, cholesterol oxidase, uric acid oxidase and xanthine oxidase. The preferred oxidases are glucose oxidase, galactose oxidase and alcohol oxidase. Especially preferred is the $C_1$–$C_4$ alkanol oxidase obtained from a catalase-negative *Hansenula polymorpha* strain, as described in EP-A-244 920 (Unilever). The hydrogen peroxide generating enzyme can be used in combination with an activator, for instance one that generates peracetic acid. Such activators are well known in the art and include tetraacetylethylenediamine (TAED) and sodium nonanoyloxybenzenesulphonate (SNOBS). These and other related compounds are described in fuller detail by Grime and Clauss in Chemistry & Industry (15 Oct. 1990) 647–653.

Alternatively, a transition metal catalyst could be used in combination with a hydrogen peroxide generating enzyme to increase the bleaching power. Examples of manganese catalysts are described by Hage et al. (1994) Nature 369, 637–639. Alternatively, the enzyme is a haloperoxidase, an enzyme capable of generating a hypohalite from a halide ion. Preferred haloperoxidases are chloro-peroxidases and the corresponding bleaching chemical is hypochlorite. Especially preferred chloroperoxidases are Vanadium chloroperoxidases, for example from *Curvularia inaequalis*. Alternatively, peroxidases or laccases may be used. Examples of laccase/enhancer systems are given in WO-A-95/01426. Examples of peroxidase/enhancer systems are given in WO-A-97/11217.

Once a suitable enzyme is chosen, it is relatively easy for the skilled man to isolate a suitable micro-organism capable of producing the enzyme under washing conditions. To that end, micro-organisms are screened for their capability of producing the desired enzyme under washing conditions, in an assay that resembles the washing conditions as closely as possible.

If desired, the article of the present invention may also contain, in addition to the micro-organisms, conventional detergent ingredients such as surfactants, builders, sequestring agents, optical brighteners, perfumes, etc., provided that these ingredients are compatible with the micro-organisms. The amounts of these ingredients can be optimized by simple experimentation.

The article of the present invention can be advantageously used in an enzymatic hand wash process for cleaning fabrics. In this process, soiled fabrics are soaked with water in the presence of the article according to the invention as described above. After a soaking period that may extend over 15 minutes to several hours or even days, the wash water is discarded and the fabrics are rinsed thoroughly. At that stage, the fabrics may be sufficiently clean to be dried or they may require a further washing step using more conventional detergent products such as soap bars or detergent powders. The effect of such a further washing step will be markedly better by virtue of the presence of the first treatment.

The invention will now be further illustrated by the following, non-limiting examples. In the accompanying drawings:

FIG. 1*a* shows the presence of oxidative enzyme in the culture supernatant produced from *Penicillium pinophilum*, FIG. 1*b* shows a reduction in the intensity of the RR6 dye in the culture supernatant of the same.

FIGS. 2*a* and 2*b* show the presence of both sugar oxidase and Laccase in the culture supernatants of *Trametes versicolor.*

FIG. 3 shows the production of sugar oxidase in a sachet prototype.

FIG. 4 shows sugar oxidase activity in biobag cultures.

FIG. 5 shows laccase activity in biobag cultures.

FIG. 6 shows a graphical interpretation of the biobag performance on oily tomato stains. In FIG. 6, Flasks 1 & 2=Biobag, Flask 3=Biobag plus enhancer, Flask 4=Enhancer only.

Order of swatch removal: [1]=removal after 1 hour, [2]=removal after 4 hours.

EXAMPLE 1

Bleaching of RR6 Dye with Sugar Oxidase Produced from *Penicillium pinophilum.*

A defined medium containing sucrose as a carbon source was inoculated with spores and mycelia of *Penicillium pinophilum*. Reactive Red 6 dye was also added to this medium. The inoculated medium was cultured with shaking at 30° C. and samples were taken periodically. The samples were tested for enzyme activity and differences in dye intensity.

FIG. 1 shows the activity of sugar oxidase in cultures PP1, 2 and 3 (only PP3 contained RR6). All flasks show good activity. FIG. 1*a* shows the reduction of RR6 in culture PP3, overall 70% of the dye was bleached.

(i) Bleaching of RR6 Dye from Enzymes Produced by *Trametes Versicolor*

A complex medium was inoculated with mycelia of *Trametes versicolor* and monitored for enzyme production. Both laccase and sugar oxidase production was detected. At this point, RR6 was added and samples taken over time. FIGS. 2*a* and 2*b* show the detection of enzyme activity.

EXAMPLE 2

Immobilisation and Growth of Micro-Organisms on a Matrix Support (i) Activation of Membrane A sterile membrane was activated with mycelia and spores of *Penicilium pinophilum* taken from a potato dextrose agar plate. The membrane was then added to a sterile petri-dish containing 1 ml of sterile, 10% sucrose and left at 30° C. to dry overnight. The membrane was then stored in a sealed container at 4° C. until required. The membrane was placed in a PET bag and closed with a sterile dialysis clip. The bag was placed into a 250 ml baffled flask containing 100 ml of fungal growth broth and placed in a shaking incubator at 29° C. overnight.

(ii) Assay for Sugar Oxidase Activity

A culture sample was removed and spun at 13,000 RPM in a microfuge for 5 minutes. The supernatant was then filtered with a 0.2 μm filter into a sterile tube. The supernatant (PP membrane 24 hours) was diluted in sterile phosphate buffer pH 6.5 and 100 μl aliquots was dispensed into the wells of a microtitre plate. Substrate containing 10 mM Glucose, 1 μg/ml peroxidase enzyme and 10 μg/ml TMB in 0.1M Phosphate pH 6.5 was added at 100 μl/well to each dilution and allowed to develop. The reaction was stopped by adding 100 μl/well 1M HCL and read at 450 nm.

EXAMPLE 3

Activation and Evaluation of *Trametes versicolor* Immobilised on an Absorbent Matrix.

(i) Culture of *Trametes versicolor* on Potato Dextrose Agar

Potato dextrose agar was poured into 20 cm petri-dish and allowed to set. Mycelia were taken from a *Trametes Versicolor* culture on an agar slope, and spread over the surface of the PDA plate with a sterile loop. The plate was incubated at 30° C. for 4 days, until a mycelial mat had grown.

(ii) Inoculation of Culture Medium

A small plug was removed from the culture plate and placed in a 250 ml flask containing 100 ml of TV medium. The flask was placed in a shaking incubator at 29° C. and tested over the course of 4 days for enzyme production.

(iii) Colonisation of Synthetic Absorbent.

A commercially available synthetic absorbent material was treated with UV to initially sterilize and remove contaminants. After 4 days growth the *Trametes versicolor* culture was thick with biomass and the oxidase enzyme production had peaked and was in decline. This was due to exhausted substrate.

At this point, 100 ml of fresh TV medium was added and approximately 4 g of absorbent. Replaced the flask at 29° C. with shaking for a further 24 hours. Poured away the excess liquid from the flask (some had been absorbed by the absorbent), most of the biomass had aggregated around it. The activated absorbent was placed onto a large sterile petri dish and 1 ml of 20% sucrose and 10 ml of 0.5% malt extract were added. The covered material was placed at 37° C. for 48 hours before placing at +4° C. for storage.

(iv) Preparation and Use of Simple Biobags

Woven bags made from polyethylene teraphthalate (PET) were treated with UV to initially sterilize and remove contaminants. Three of these bags were filled with the Trametes colonised absorbent, approximately 7.6 g was added per bag. The bags were closed with clips that had been treated with 70% ethyl alcohol to remove micro-organisms. Another bag was prepared with uncolonised dry absorbent; approximately 2 g per bag was used, a smaller amount was added to take account of the moisture and biomass.

Each bag was placed into a 250 ml flask containing 150 ml of TV medium and placed at 29° C. with shaking. Samples were taken after 3, 24 and 48 hours and assayed for sugar oxidase activity (FIG. 4) and laccase activity (FIG. 5). To test the bleaching activity of the system, two oily tomato stains were added to each of the 4 flasks, to flask 3 (activated absorbent) and flask 4 (non-activated absorbent) 50 μm PTP was added to look at the effect of an enhancer. The flask were replaced in the shaking incubator for 1 hour before one swatch was removed from each flask. Each swatch was rinsed in sterile demineralised water and placed at 30° C. in the dark to dry. The flasks were replaced in the shaking incubator for a further three hours, after which the remaining swatches were removed rinsed at left to dry.

The dry cloths were measured using a Macbeth CE7000 and the ΔE of the stains was determined against the untreated stain. The results are shown in Table 1 and FIG. 6.

In the supernatants taken from the Biobag cultures sugar oxidase activity was detected in flasks 1–3 after 3 hours, this activity decreased slightly after 24 hours but was maintained well during the course of the experiment. Laccase was detected after 24 hours culture and was increased at 48 hours for the start of the experiment. The blank biobag showed no production of either enzyme.

The results show a significant difference in the amount of stain removed in flasks 1 and 3 after the first hour of treatment. Flask 4 containing the non-activated biobag also shows some stain removal. After 4 hours, the stain removal has increased significantly in all of the flasks containing the activated biobags. When enhancer was present (flask 3) the level of stain removal, compared to the flask with the biobag only, was improved by 7 units in the first hour and approximately 13 units after 4 hours. This example shows successful enzyme production and stain removal by means of an article according to the invention.

TABLE 1

Delta E results of stains after Biobag treatment

| Flask | Swatch no | L | a | B | L* | a* | b* | ΔE | ΔΔE |
|---|---|---|---|---|---|---|---|---|---|
| 1 | 1 | 72.084 | 17.361 | 39.725 | 81.691 | 7.874 | 32.288 | 15.414 | 3.4644 |
| 1 | 3 | 73.931 | 17.374 | 40.802 | 85.806 | 4.368 | 28.288 | 21.6049 | 6.7849 |
| 2 | 6 | 73.379 | 15.921 | 38.462 | 81.481 | 8.316 | 33.645 | 12.1112 | 0.1612 |
| 2 | 5 | 72.522 | 16.889 | 39.368 | 85.201 | 5.118 | 27.664 | 20.8877 | 6.0677 |
| 3 | 8 | 72.559 | 16.882 | 38.465 | 84.212 | 4.978 | 23.379 | 22.4741 | 10.524 |
| 3 | 7 | 73.671 | 14.731 | 36.942 | 91.079 | 0.295 | 11.476 | 34.0580 | 19.238 |
| 4Blank | 11 | 73.929 | 15.403 | 39.048 | 80.769 | 8.256 | 32.347 | 11.9485 | — |
| 4Blank | 9 | 71.132 | 17.621 | 38.486 | 81.154 | 8.557 | 32.402 | 14.8193 | — |

Swatch data is given in order of removal i.e. 1 hour followed by 4 hours.
*Indicates readings taken after treatment in Biobag system.

The invention claimed is:

1. Article for use in an enzymatic fabric cleaning process, said article containing one or more types of harmless micro-organisms capable of excreting enzymes useful in said fabric cleaning process, the micro-organisms being effectively contained within the article so that they cannot disperse from it into the wash water said microorganisms being immobilized on an organic polymeric material within a water-permeable bag or sachet made of cellulosic or plastic polymer derivative.

2. Article according to claim 1, in the form of a sachet, said sachet being permeable for said enzymes, but impermeable for said micro-organisms.

3. Article according to claim 2, wherein said sachet contains a matrix onto which the micro-organisms are immobilised.

4. Article according to claim 1, wherein said micro-organisms are immobilised onto a matrix, wherein said matrix is itself capable of absorbing particulate soil, dyes and/or oil.

5. Article according to claim 1, wherein the enzymes produced are selected from the group consisting of Oxidoreductases, Carbohydrases, Proteases, Lipases, Transferases and Glycosidases.

6. Article according to claim 1, further comprising an enhancer for said enzyme.

7. Article according to claim 1, whereby said micro-organisms are additionally capable of producing biosurfactants.

8. Kit of parts, comprising the article according to claim 1 and a separate article comprising an absorber material to remove part or all of any particulates, oils or dyes.

9. Method for cleaning fabrics, whereby soiled fabrics are soaked with water in the presence of the article according to claim 1.

10. Method for cleaning fabrics, whereby soiled fabrics are soaked with water in the presence of the article according to claim 1, and wherein the fabric is cotton, polyester, polyester/cotton, or wool.

* * * * *